United States Patent [19]
Randrup

[11] 3,840,111
[45] Oct. 8, 1974

[54] CHAIN CONVEYOR
[75] Inventor: Benjamin F. Randrup, Sebastopol, Calif.
[73] Assignee: F. Korbel and Brothers, Inc., Guerneville, Calif.
[22] Filed: July 24, 1972
[21] Appl. No.: 274,440

[52] U.S. Cl................................ 198/190, 198/162
[51] Int. Cl............................................. B65g 15/10
[58] Field of Search ............ 198/162, 181, 182, 190

[56] References Cited
UNITED STATES PATENTS
573,318  12/1896  Zellers .............................. 198/190
3,061,069  10/1962  Young............................ 198/33 AA FOREIGN PATENTS OR APPLICATIONS
230,204  3/1925  Great Britain ..................... 198/190

Primary Examiner—Richard A. Schacher
Attorney, Agent, or Firm—Warren, Manfred & Chickering

[57]  ABSTRACT

A drag chain conveyor including a deflector assembly comprising upstanding sheaves arranged to receive the link chain from one straight segment of the conveyor and change the course thereof upon delivery to an adjacent straight segment, so as to achieve overall change of direction of the conveyor system without the use of special components.

1 Claim, 4 Drawing Figures

PATENTED OCT 8 1974 3,840,111
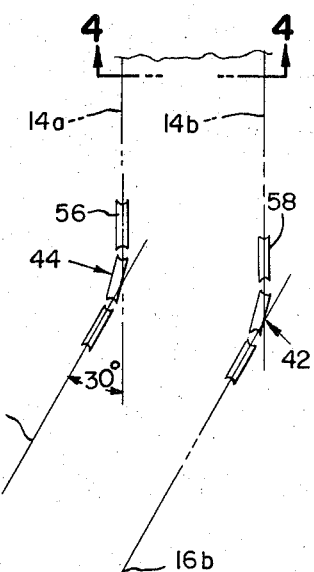
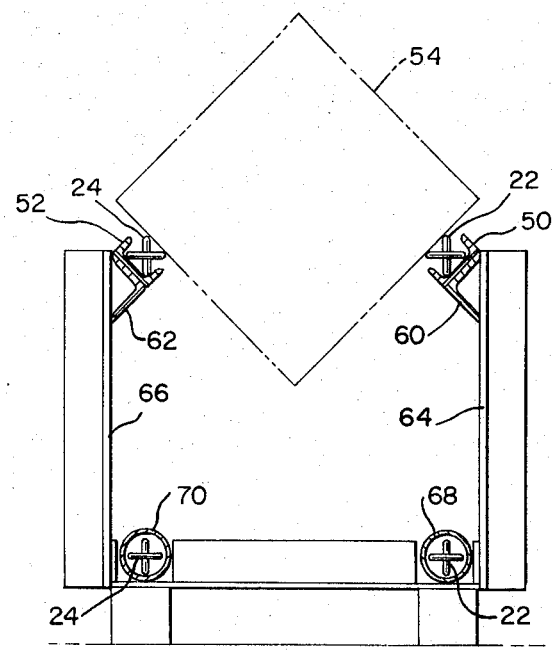
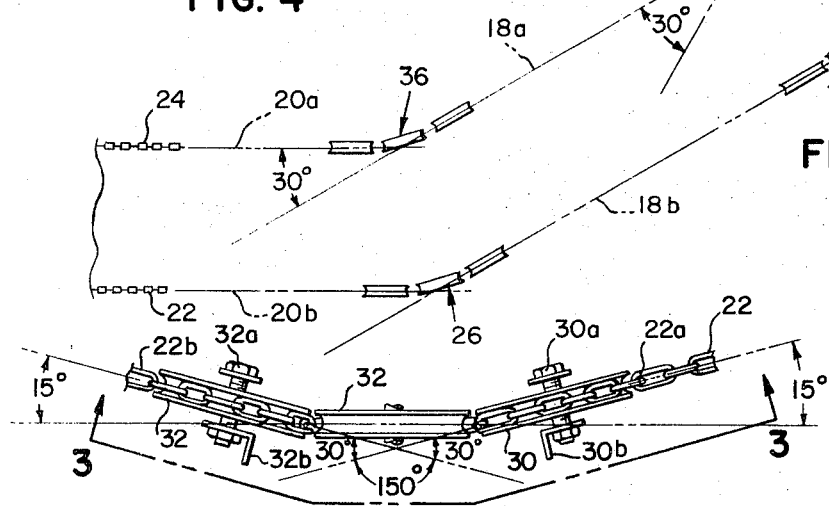
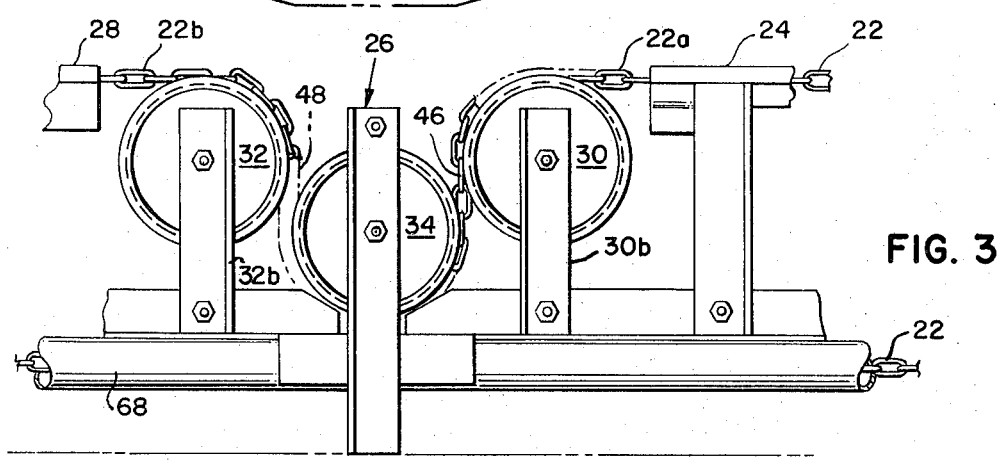
FIG. 4
FIG. 1
FIG. 2
FIG. 3

CHAIN CONVEYOR

This invention relates to chain conveyors and more particularly to conveyors of the drag chain type that utilize one or more chains slidably supported by a suitable frame to engage directly articles such as empty or packed cartons, or other types of containers, for conveyance from one station to another.

A common application for conveyors of this type may be found in a variety of plants wherein empty containers are required to be moved from an initial station of storage and assembly to a second station where a subsequent operation, such as packing the container occurs; and then to a third or further station for storage, handling, or shipment away from the plant.

Common link chains are preferred for this type of conveyor because (1) such chain is relatively inexpensive and readily attainable as a stock item, (2) common link chain, particularly when assembled to provide parallel tracks or runners provide a relatively non-damaging yet tractable surface by which to grip and convey the items to be transported therealong; and (3) link chain conveyors lend themselves to be conveniently powered for level or inclined travel under load. Still a further advantage of common link chain, one that I particularly utilize in the instant invention, is that a length of such chain may be flexed about its longitudinal axis to produce as much as 90° rotation thereabout, without unduly stressing the chain or causing any appreciable change in length.

A requirement of drag chain conveyors is that they must negotiate curves from a few degrees to as many as 90°, i.e., a right angle change of direction, and even greater, depending upon the physical demands of the particular plant layout. This one requirement, change of direction, especially when coupled with usual design needs such as guidance of the goods being transported on the conveyor, flexibility of assembly to accommodate as many different types of layouts as possible, and related criteria, has proved to be troublesome to the industry. A number of schemes have been developed to solve this problem. Ordinarily these involve conveyor assemblies with multiple rollers upon which objects to be conveyed are trundled by means of engagement with a drag chain. Additionally such devices normally require guard rails to guide the objects being transported therealong.

Generally such prior art conveyors require special structural and mechanical components, such as extruded chain guides, numerous rollers and roller bearings, complex frames including guard rails; and these involve relatively high initial cost and special components that may not be readily available for replacement. Further, such equipment generally incurs relatively high maintenance expenditures over its useful life.

An example of a typical prior art roller and drag chain conveyor available commercially is seen in the U.S. Pat. No. 3,329,257 to H. B. Rice for CONVEYOR STRUCTURE, patented July 4, 1967.

It is an object of the present invention to provide an improved drag chain conveyor capable of negotiating curves of up to 90°, and greater, as necessary for a particular application.

It is a feature and advantage of the present invention that the improved conveyor thereof may be fabricated entirely of standard stock components which are readily available and of relatively low cost.

It is also an object of this invention to provide a chain conveyor which in one embodiment thereof eliminates the need for conveyor roller assemblies, or their equivalent, and for guide rails along each side of the conveyor to constrain and guide objects thereon.

A further object of my invention is to provide a drag chain conveyor assembly which may be used in conjunction with certain prior art equipment, thereby to improve an existing installation at least insofar as the drag chain arrangement itself is concerned.

Numerous other objects, features, and advantages will become apparent to one of ordinary skill in the art of conveyors upon a reading of the following specification and with reference to the accompanying drawing.

FIG. 1 is a general plan view in schematic form illustrating a double drag chain conveyor embodying my invention;

FIG. 2 is a plan view of a portion of the chain conveyor arrangement shown in FIG. 1 drawn to a somewhat enlarged scale to better show certain details;

FIG. 3 is a side elevation taken along line 3—3 in FIG. 2; and, as will be noted, the sectional line is broken so that the elevation is straight on throughout the view; and FIG. 4 is a typical sectional view of a drag chain conveyor embodying my invention, for example as taken along line 4—4 in FIG. 1.

This invention is best understood by referring first to FIG. 1 which discloses a more or less schematic layout of a typical drag chain conveyor 12. This particular portion of the conveyor includes straight conveyor segments 14a, 14b; segments 16a, 16b; 18a, 18b; and portions of 20a, and 20b. The layout of FIG. 1 not only serves to give an overall view of a portion of a conveyor utilizing my invention, but also illustrates one of the more vexing problems in drag chain conveyor design and manufacture which my invention overcomes, the accommodation of a conveyor run that goes around a curve, viz the total change of direction of 90° from straight segments 14a, 14b to 20a, 20b.

Such change of conveyor direction is accomplished in accordance with the present invention without employing special chain guidance or extrusion sections, nor by the employment of a single drag chain in combination with numerous rollers and side guides. By the use of my invention I am able to manage most any change in conveyor course utilizing relatively simple and standard components having low initial cost, ease of fabrication, installation and maintenance. Such features offer significant advantages over the prior art with which I am familiar.

One embodiment of my invention as shown at 12 utilizes continuous lengths of chain 22, 24 with chain 22 shown in somewhat greater detail and further designated as sections 22a and 22b in FIGS. 2 and 3. For purposes of explanation in this specification it is convenient to identify the continuous chain lengths 22, 24 as being made up of continuous and adjacent chain sections along straight segments of the conveyor run. For example, straight segment 18b of the conveyor run at 12 consists of chain section 22a (FIGS. 2 and 3) carried by support channel 24, the latter being a standard rolled channel shape available from most any steel supplier.

The chain is altered in its course of direction as it is carried by and through the deflector assembly 26, explained in greater detail below, and thereafter is identified in the Figures as chain section 22b carried by support channel 28 to form straight segment 20b. Obviously, chain sections 22a and 22b, and the portions of the chain wrapped about sheaves 30, 32 and 34, comprise a portion of a continuous length of chain 22.

During operation the continuous chain length moves from support 24, through deflector assembly 26, and thence to support 28. In the course of such travel, straight segments 18b and 20b change direction, in plan view, some 30° (FIG. 3).

The key to this most salutary aspect of my invention is achieved by utilizing an inherent characteristic of common link chain, i.e., its ability to be twisted about its longitudinal axis for as much as 90° or so without causing undue stress or change in chain length, and combining such chain with a novel deflector assembly as shown at 26 of FIGS. 2 and 3. Substantially the same description and explanation applies to deflector assemblies 36–44, and it is therefor unnecessary to repeat the detailed description of these assemblies.

Principally, deflector assembly 26 consists of deflector sheaves 30, 32 spaced apart to permit the presence of intermediate sheave 34. Each of the sheaves is formed with a chain-receiving groove at its periphery. Deflector sheaves 30, 32 are rotatably carried in an upstanding position by conventional axle assemblies 30a, 32b. Furthermore, these sheaves are positioned so that sheave 30 is immediately next to chain support 24, and sheave 32 to chain support 28, with the uppermost portion of each sheave's groove seat on landing at the same elevation as the adjacent chain-carrying portion of the associated support means. Moreover, each of sheaves 30, 32 is aligned so that the plane defined by their respective groove landings is in alignment with the straight segment portions of the adjacent conveyor sections.

Intermediate sheave 34 is rotatably and upstandingly carried in a manner similar to that already described for sheaves 30, 32. Sheave 34 is selected to have a peripheral groove diameter which locates the groove landings on the opposite sides in vertical alignment with the groove landings on one side of each of the adjacent deflector sheaves — see FIGS. 2 and 3.

By means of the foregoing described structure, chain section 22a is guided over deflector sheave 30, then under intermediate sheave 34, and thence about deflector sheave 32 to where the section is identified as section 22b. Of critical importance here is the forming of the generally vertical chain increments 46, 48 between sheaves 30 and 34, and 34 and 32, respectively. It is about these vertical chain groups that the orientation of the chain direction of travel is altered by rotating chain increments 46, 48 about their longitudinal axis as the chain travels therethrough, a maneuver well within the chain's normal flexing tolerance. Thus, by two such consecutive chain deflections, one from deflector sheave 30 to intermediate sheave 34, and the other from intermediate sheave 34 to deflector sheave 32, the chain alignment from segment 18b to 20b is altered by approximately 30°. By having several such segment groups linked one to the other, for example segments 14, 16, 18 and 20 (FIG. 1), the conveyor direction may be changed by 90° or more; and such change is achieved in accordance with my invention by interconnecting straight chain segments without employing special curved extruded sections and the like, so often found in the prior art to achieve a similar result.

A further advantage of my invention is that because of the relative simplicity and economy of its drag chain assembly, a pair of parallel drag chains may be employed, as illustrated in my drawing, particularly at FIG. 4. By this expedient, and by locating support channels 50, 52 at a desired predetermined interval, various sizes and shapes of parcels, such as that depicted by dashed line outline 54, may easily and conveniently be conveyed with assurance that the parcel carried will be moved along the conveyor path in a positive and safe manner. Normally, drag chain conveyors of this type utilize a single center line drag chain because the curved transition sections, which usually require special extrusions, are costly; and thus a single drag chain is preferred. In such case, the moving parcels must be carried by a multiplicity of rollers to reduce friction; and side guards to contain the conveyed articles are normally required. Since a major part of the weight of a loaded parcel must then be supported by the single center line drag chain, which incidentally also often requires the use of costly replaceable nylon liners to cut down on chain wear, loaded cartons are often dented by the chain. With conveyors utilizing my invention, and employing a pair of parallel chains, the load is better distributed therebetween with less damage to the loaded parcels, and no expensive liners are required in the bosom of the standard channel or angle supports.

Another feature of my invention is the ease with which it may be adapted to inclined conveyor travel. Whether initiating a curved section or on the straight-away, straight segments such as 14a, 14b may be elevated at one end. In such case section 14a is located to approach sheave 56 at an angle, but the chain carried thereon still wraps over sheave 56 the same as it would if segment 14a were horizontal.

In some instances, for example where the inclined section also leads into a curve, there is a slight difference in angle of the opposite and parallel straight segments, because of the difference in segment lengths caused by the geometry of the changed direction section — note for example how sheave 58 adjacent straight segment 14b leads sheave 56 — but this difference of angle has little noticeable effect since the parcels are carried between the supported chain sections.

Further details of interest and features of my invention should be noted. For example, all of the support members shown, for example channel 50, 52 (FIG. 4), are welded or otherwise suitably secured to angles 60, 62, respectively. The angles in turn are attached to upright supports 64, 66. The backs of the channels are thus seen to rest at 45° with chains 22, 24 carried in the bosom of the channels for optimal engagement with a box or parcel to be conveyed. Of course other positions of the channel could be utilized, for example with the backs thereof horizontal; and other rolled steel sections other than channel may be selected.

Although not shown, each of the drag chains of my invention may be driven by conventional link chain drives that generally comprise a pair of motor driven pocketed chain wheels about which each endless chain 22, 24 is wrapped. The chain is returned to a head sheave at the opposite end of the conveyor line via pipe housings 68, 70. An evident feature of my invention from the foregoing is that it lends itself to modular construction, for example 10 foot sections which I have used; and these may be quickly and easily set up most anywhere on the ground for example, for a nearly universal portable drag chain conveyor assembly.

I claim:

1. In a drag chain conveyor of the type utilizing a continuous length of chain, the combination comprising:

first support means to slidably support a first section of said chain along a first straight segment of the conveyor run, second support means to slidably support a second section of said chain along a second straight segment of the conveyor run with one end of said second support means being located proximate to one end of said first support means with said second section of said chain continuous with and adjacent to said first section, each of said support means located to align the chain section supported thereon at a predetermined angle therebetween corresponding to a change of direction between said segments of the conveyor run, third support means to slidably support a third section of chain along said first straight segment of the conveyor run with said third support means and longer than said first support means, fourth support means to slidably support a fourth section of chain along said second straight segment of the conveyor run, one end of said fourth support means located proximate to one end of said third support means with said fourth section of said chain continuous with and adjacent to said third section and said fourth support means parallel with said second support means and longer than said second support means.

first and second deflector sheaves between each of said first and second support means and between said third and fourth support means, each of the deflector sheaves having a chain-receiving groove formed at the periphery thereof, means to mount said sheaves in upstanding, spaced-apart relationship adjacent respectively proximate ends of the support means with the uppermost portion of each groove landing at the same elevation as the adjacent chain-carrying portion of said associated support means and in alignment with said straight segment, intermediate deflector sheaves each having a chain-receiving groove formed at the periphery thereof, means to mount said intermediate deflector sheaves in upstanding position between said deflector sheaves, said intermediate sheaves shaped and positioned so that the groove landings on opposite sides thereof are in vertical alignment with the proximate groove landings of the adjacent deflector sheaves, whereby said first section and said third section of chain may be wrapped over first deflector sheaves and under said intermediate deflector sheaves and said second section and said fourth section of chain continuous respectively with said first section and said third section may be wrapped over said second deflector sheaves and under said intermediate sheaves with the change in the chain alignment from one segment of the conveyor to the next, characterized by rotation of the chain about the vertical sections thereof carried by the intermediate sheave groove landings and the adjacent deflector sheave groove landings, said first and third support means and said second and fourth support means being spaced and adapted to carry said chains with clearance therebetween so that an article carried by the chains and depending into the space between said chain supports is out of rubbing contact therewith.

* * * * *